(12) United States Patent
Miura et al.

(10) Patent No.: US 10,796,173 B2
(45) Date of Patent: Oct. 6, 2020

(54) VEHICLE CONTROL DEVICE

(71) Applicant: HONDA MOTOR CO., LTD., Minato-Ku, Tokyo (JP)

(72) Inventors: Hiroshi Miura, Wako (JP); Toshifumi Suzuki, Wako (JP); Marina Saikyo, Wako (JP); Suguru Yanagihara, Wako (JP); Yuta Takada, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 43 days.

(21) Appl. No.: 16/299,937

(22) Filed: Mar. 12, 2019

(65) Prior Publication Data
US 2019/0286926 A1 Sep. 19, 2019

(30) Foreign Application Priority Data

Mar. 14, 2018 (JP) .................................. 2018-046209

(51) Int. Cl.
*G06K 9/00* (2006.01)
*G05D 1/02* (2020.01)

(52) U.S. Cl.
CPC ....... *G06K 9/00818* (2013.01); *G05D 1/0214* (2013.01); *G06K 9/00798* (2013.01); *G06K 9/00825* (2013.01)

(58) Field of Classification Search
CPC .............. G05D 1/0214; G06K 9/00798; G06K 9/00825
See application file for complete search history.

(56) References Cited

U.S. PATENT DOCUMENTS

| 9,766,628 | B1 * | 9/2017 | Lo .................... G05D 1/0246 |
| 2014/0067187 | A1 | 3/2014 | Ferguson et al. |
| 2017/0291547 | A1 * | 10/2017 | Lai .................... G08G 1/167 |

FOREIGN PATENT DOCUMENTS

| JP | 2006-264465 A | 10/2006 |
| JP | 2009-156783 A | 7/2009 |
| JP | 2015-537268 A | 12/2015 |
| JP | 2018-022348 A | 2/2018 |

OTHER PUBLICATIONS

Office Action dated Oct. 1, 2019 issued over the corresponding Japanese Patent Application No. 2018-046209 with the English translation thereof.

* cited by examiner

*Primary Examiner* — Edward Park
(74) *Attorney, Agent, or Firm* — Carrier Blackman & Associates, P.C.; Joseph P. Carrier; William D. Blackman (57) ABSTRACT

An external environment recognition unit recognizes a construction section ahead of a host vehicle and recognizes that one or more recognition objects express entry possible/impossible information as to whether the host vehicle can enter the construction section. If the external environment recognition unit recognizes a traffic control person who directs traffic in the construction section as the recognition object and recognizes the entry possible/impossible information that is expressed by the traffic control person, an action plan unit (or an entry determination unit) decides whether to cause the host vehicle to enter the construction section or to stop before the construction section by using preferentially the entry possible/impossible information that is expressed by the traffic control person.

6 Claims, 8 Drawing Sheets

VEHICLE CONTROL DEVICE

CROSS-REFERENCE TO RELATED APPLICATION

This application is based upon and claims the benefit of priority from Japanese Patent Application No. 2018-046209 filed on Mar. 14, 2018, the contents of which are incorporated herein by reference.

BACKGROUND OF THE INVENTION

Field of the Invention

The present invention relates to a vehicle control device that performs automated driving or driving assistance of a host vehicle.

Description of the Related Art

Japanese Laid-Open Patent Publication No. 2009-156783 discloses a navigation device that includes a host vehicle position recognition device. This navigation device corrects host vehicle position information expressing the current position of the host vehicle on the basis of a result of recognizing a ground object or the like. On the other hand, the navigation device does not correct the host vehicle position information when the ground object is moved by construction work, for example. Thus, the navigation device can recognize the host vehicle position with high accuracy.

SUMMARY OF THE INVENTION

In a construction section or a section under construction as described in Japanese Laid-Open Patent Publication No. 2009-156783, a traffic control person who directs traffic is disposed, for example. A temporary traffic light may be disposed. The traffic control person expresses whether vehicles can enter the construction section by a movement of a handflag or a traffic wand. The temporary traffic light expresses whether vehicles can enter the construction section by a display color or time display.

Incidentally, an automated driving vehicle in which a vehicle control device performs at least one type of control among driving, braking, and steering of the host vehicle has been developed in recent years. The automated driving vehicle recognizes a state of an external environment by using a camera, a radar, a LIDAR, map information, or the like, and determines an optimal control content, so that travel control is performed. However, if there are pieces of information expressing whether vehicles can enter the construction section as described above, for example, the traffic control person and the temporary traffic light, the vehicle control device cannot choose the information to use. As a result, the vehicle control device cannot determine whether the host vehicle can enter the construction section.

The present invention has been made in view of the above problem and an object is to provide a vehicle control device that can appropriately determine whether a host vehicle can enter a construction section.

A vehicle control device according to the present invention includes: an external environment recognition unit configured to recognize a peripheral state of a host vehicle; an action plan unit configured to determine an action to be performed by the host vehicle on a basis of a recognition result from the external environment recognition unit; and a vehicle control unit configured to perform travel control of the host vehicle on a basis of a determination result from the action plan unit, wherein: the external environment recognition unit is configured to recognize a construction section ahead of the host vehicle and recognize that one or more recognition objects express entry possible/impossible information as to whether the host vehicle can enter the construction section; and if the external environment recognition unit recognizes a traffic control person who directs traffic in the construction section as the recognition object and recognizes the entry possible/impossible information that is expressed by the traffic control person, the action plan unit is configured to decide whether to cause the host vehicle to enter the construction section or to stop before the construction section by using preferentially the entry possible/impossible information that is expressed by the traffic control person.

In the above configuration, if pieces of entry possible/impossible information are recognized and the pieces of entry possible/impossible information include the entry possible/impossible information expressed by the traffic control person, the entry possible/impossible information expressed by the traffic control person is used preferentially. Thus, it can be appropriately determined whether the host vehicle can enter the construction section.

In the present invention, the external environment recognition unit may be configured to recognize the entry possible/impossible information on a basis of a movement of a handflag or a traffic wand of the traffic control person.

In the above configuration, since the handflag or the traffic wand used in the traffic control is recognized, it is easy to recognize the entry possible/impossible information.

In the present invention, the external environment recognition unit may be configured to recognize as the traffic control person, a person who wears a helmet and/or a working uniform that emits light.

In the above configuration, since clothing peculiar to the traffic control person, such as the helmet and the working uniform is recognized, it is easy to identify the traffic control person.

In the present invention, if the external environment recognition unit does not recognize the traffic control person and recognizes a temporary traffic light that is installed in the construction section as the recognition object and the entry possible/impossible information that is expressed by the temporary traffic light, the action plan unit may be configured to decide whether to cause the host vehicle to enter the construction section or to stop before the construction section by using preferentially the entry possible/impossible information that is expressed by the temporary traffic light.

In the above configuration, if the entry possible/impossible information expressed by the traffic control person is not recognized and the entry possible/impossible information expressed by the temporary traffic light is recognized, the entry possible/impossible information expressed by the temporary traffic light is used preferentially. Thus, it can be appropriately determined whether the host vehicle can enter the construction section.

In the present invention, if the external environment recognition unit recognizes neither the traffic control person nor the temporary traffic light and recognizes the entry possible/impossible information that is expressed by the recognition object other than the traffic control person and the temporary traffic light, the action plan unit may be configured to decide whether to cause the host vehicle to enter the construction section or to stop before the construction section by using the entry possible/impossible information that is expressed by the recognition object other than the traffic control person and the temporary traffic light.

In the above configuration, if the entry possible/impossible information expressed by the traffic control person or the temporary traffic light is not recognized and other entry possible/impossible information is recognized, the latter entry possible/impossible information is used. Thus, it can be appropriately determined whether the host vehicle can enter the construction section.

In the present invention, if the external environment recognition unit recognizes a preceding vehicle that travels ahead of the host vehicle as the recognition object, the action plan unit may be configured to decide whether to cause the host vehicle to enter the construction section or to stop before the construction section in accordance with behavior of the preceding vehicle.

In the above configuration, if the entry possible/impossible information expressed by the traffic control person or the temporary traffic light is not recognized and the preceding vehicle is recognized, it can be appropriately determined whether the host vehicle can enter the construction section on the basis of the behavior of the preceding vehicle.

By the present invention, since the entry possible/impossible information expressed by the traffic control person is used preferentially, it can be appropriately determined whether the host vehicle can enter the construction section.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a vehicle control device according to the present invention will be described in detail with reference to the attached drawings.

1. Configuration of Host Vehicle 10

Figure 1:
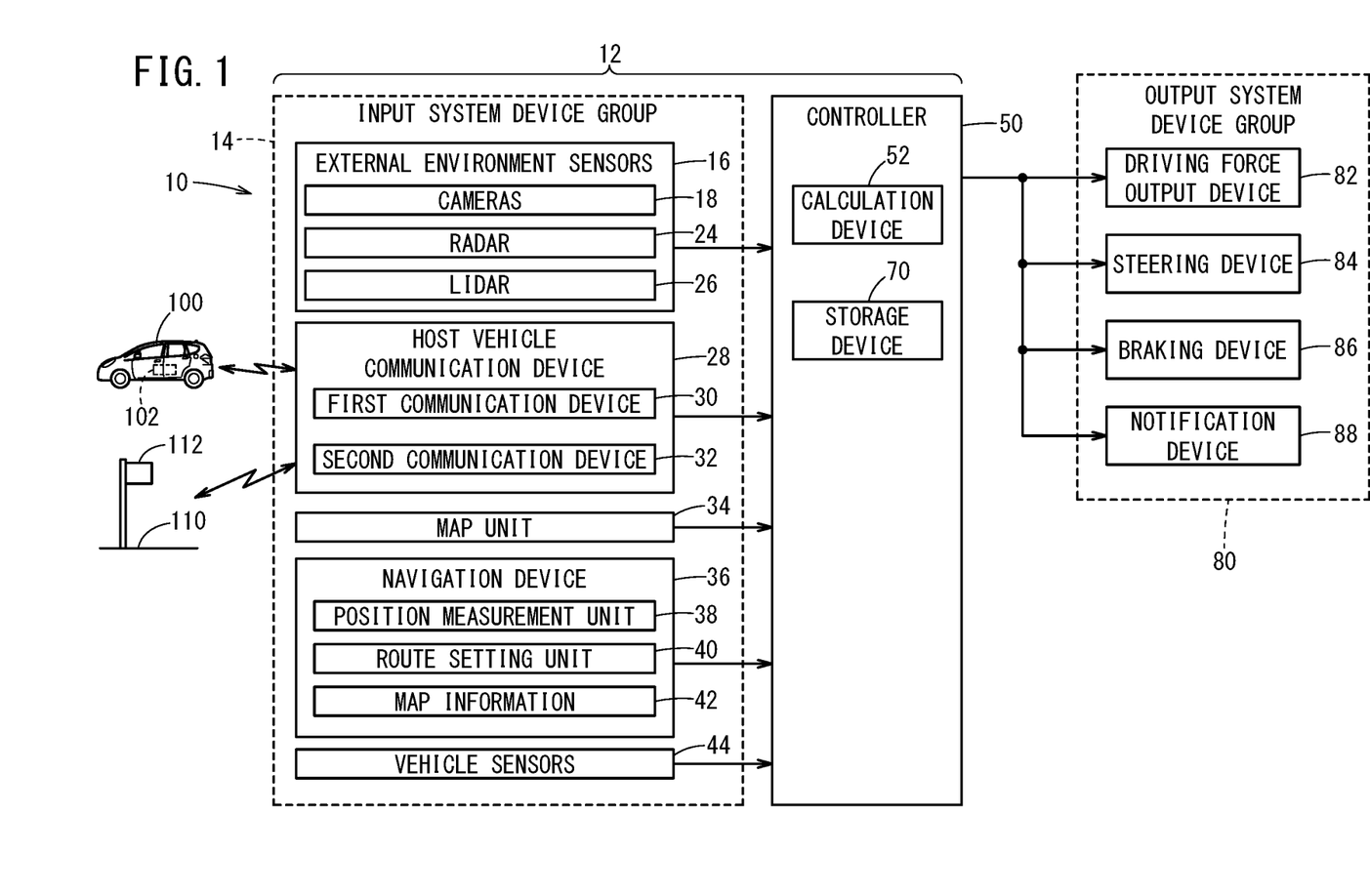
FIG. 1 is a block diagram of a host vehicle including a vehicle control device according to one embodiment.

As illustrated in FIG. 1, a host vehicle 10 includes an input system device group 14 that acquires or stores various kinds of information, a controller 50 to which information output from the input system device group 14 is input, and an output system device group 80 that operates in accordance with various instructions output from the controller 50. A vehicle control device 12 according to the present embodiment includes the input system device group 14 and the controller 50. The host vehicle 10 is an automated driving vehicle in which travel control is performed by the controller 50 (including fully automated driving vehicle) or a driving assistance vehicle in which travel control is assisted partially.

[1.1. Input System Device Group 14]

The input system device group 14 includes external environment sensors 16, a host vehicle communication device 28, a map unit 34, a navigation device 36, and vehicle sensors 44. The external environment sensors 16 detect a state of a periphery (external environment) of the host vehicle 10. The external environment sensors 16 include a plurality of cameras 18 that photographs the external environment, a plurality of radars 24 and one or more LIDARs 26 that detect the distance and the relative speed between the host vehicle 10 and peripheral objects. The host vehicle communication device 28 includes a first communication device 30 and a second communication device 32. The first communication device 30 performs inter-vehicle communication with an other-vehicle communication device 102 provided for another vehicle 100 to acquire external environment information including information regarding the other vehicle 100 (such as a type of vehicle, a travel state, or a travel position). The second communication device 32 performs road-vehicle communication with a road-side communication device 112 provided for an infrastructure such as a road 110 to acquire external environment information including the road information (such as information regarding a traffic light or a traffic jam). The map unit 34 stores high-precision map information including the number of lanes, the type of lane, the lane width, and the like. The navigation device 36 includes a position measurement unit 38 that measures the position of the host vehicle 10 by a satellite navigation method and/or a self-contained navigation method, map information 42, and a route setting unit 40 that sets a scheduled route from the position of the host vehicle 10 to a destination on the basis of the map information 42. Note that the high-precision map stored in the map unit 34 and the map information 42 stored in the navigation device 36 are hereinafter referred to as the map information 42 collectively unless otherwise stated. The vehicle sensors 44 detect the travel state of the host vehicle 10. The vehicle sensors 44 include a vehicle speed sensor, an acceleration sensor, a yaw rate sensor, an inclination sensor, a travel distance sensor, and the like, that are not shown.

[1.2. Output System Device Group 80]

The output system device group 80 includes a driving force output device 82, a steering device 84, a braking device 86, and a notification device 88. The driving force output device 82 includes a driving force output ECU, and a driving source such as an engine or a traction motor. The driving force output device 82 generates driving force in accordance with a vehicle occupant's operation of an accelerator pedal or a driving control instruction that is output from the controller 50. The steering device 84 includes an electric power steering system (EPS) ECU and an EPS actuator. The steering device 84 generates a steering force in accordance with a vehicle occupant's operation of a steering wheel or a steering control instruction that is output from the controller 50. The braking device 86 includes a braking ECU and a braking actuator. The braking device 86 generates a braking force in accordance with a vehicle occupant's operation of a braking pedal or a braking control instruction that is output from the controller 50. The notification device 88 includes a notification ECU and an information transmission device (such as a display device, an audio device, or a haptic device). The notification device 88 notifies a vehicle occupant in accordance with a notification instruction that is output from the controller 50 or another ECU.

[1.3. Controller 50]

Figure 2:
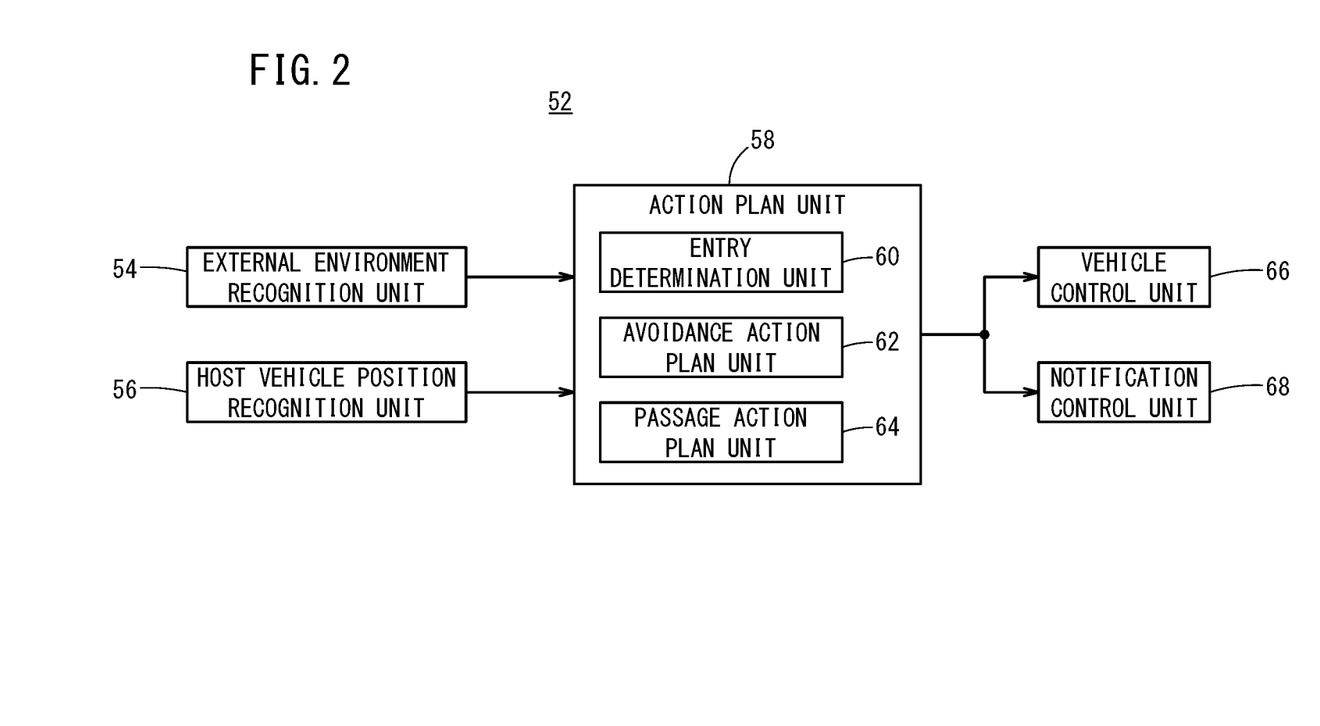
FIG. 2 is a function block diagram of a calculation device.

The controller 50 is configured by an ECU, and includes a calculation device 52 such as a processor and a storage device 70 such as a ROM or a RAM. The controller 50 achieves various functions when the calculation device 52 executes programs stored in the storage device 70. As illustrated in FIG. 2, the calculation device 52 functions as an external environment recognition unit 54, a host vehicle position recognition unit 56, an action plan unit 58, a vehicle control unit 66, and a notification control unit 68.

The external environment recognition unit 54 recognizes the peripheral state of the host vehicle 10 on the basis of the information output from the external environment sensors 16, the host vehicle communication device 28, the map unit 34, and the navigation device 36. For example, the external environment recognition unit 54 recognizes the existence, position, size, type, and entry direction of the other vehicle 100 that travels or stops near the host vehicle 10 and moreover recognizes the distance and the relative speed between the host vehicle 10 and the other vehicle 100, on the basis of image information acquired by the cameras 18, information acquired by the radars 24 and the LIDARs 26, and the external environment information acquired by the first communication device 30. In addition, the external environment recognition unit 54 recognizes the shape, type and position of a recognition object included in the road environment on the basis of the image information acquired by the cameras 18, the information acquired by the radars 24 and the LIDARs 26, the map information 42, and the external environment information acquired by the second communication device 32. The external environment recognition unit 54 recognizes a signal expressed by a traffic light or a temporary traffic light 154 (an entry possible state, or an entry impossible state) on the basis of the image information acquired by the cameras 18 and the external environment information acquired by the second communication device 32.

The host vehicle position recognition unit 56 recognizes the position of the host vehicle 10 on the basis of the information output from the map unit 34 and the navigation device 36.

The action plan unit 58 determines an action to be performed by the host vehicle 10 on the basis of recognition results from the external environment recognition unit 54 and the host vehicle position recognition unit 56, and the detected information and stored information of the input system device group 14. If the travel control is performed, a travel trajectory and a target speed are set. In the present embodiment, the action plan unit 58 includes an entry determination unit 60, an avoidance action plan unit 62, and a passage action plan unit 64. The entry determination unit 60 performs a determination process as to whether the host vehicle 10 can enter a section (construction section 130) where an avoidance object 120 (FIG. 3) exists. The avoidance action plan unit 62 performs a process for causing the host vehicle 10 to avoid the avoidance object 120. The passage action plan unit 64 performs a process for causing the host vehicle 10 to travel in the section where the avoidance object 120 exists and a process for returning the travel position of the host vehicle 10 in a road width direction from an avoidance position to a first travel path 114.

The vehicle control unit 66 controls the output system device group 80 on the basis of behavior of the host vehicle 10 planned by the action plan unit 58. For example, the vehicle control unit 66 calculates a steering instruction value based on the travel trajectory set by the action plan unit 58, and an acceleration/deceleration instruction value based on the target speed, and outputs control instructions to the driving force output device 82, the steering device 84, and the braking device 86.

The notification control unit 68 outputs the notification instruction to the notification device 88 on the basis of a notification action planned by the action plan unit 58.

The storage device 70 illustrated in FIG. 1 stores numerals such as thresholds and predetermined values used in comparison, determination, or the like in each process, in addition to various programs to be executed by the calculation device 52.

2. Circumstance Assumed in the Present Embodiment

Figure 3:
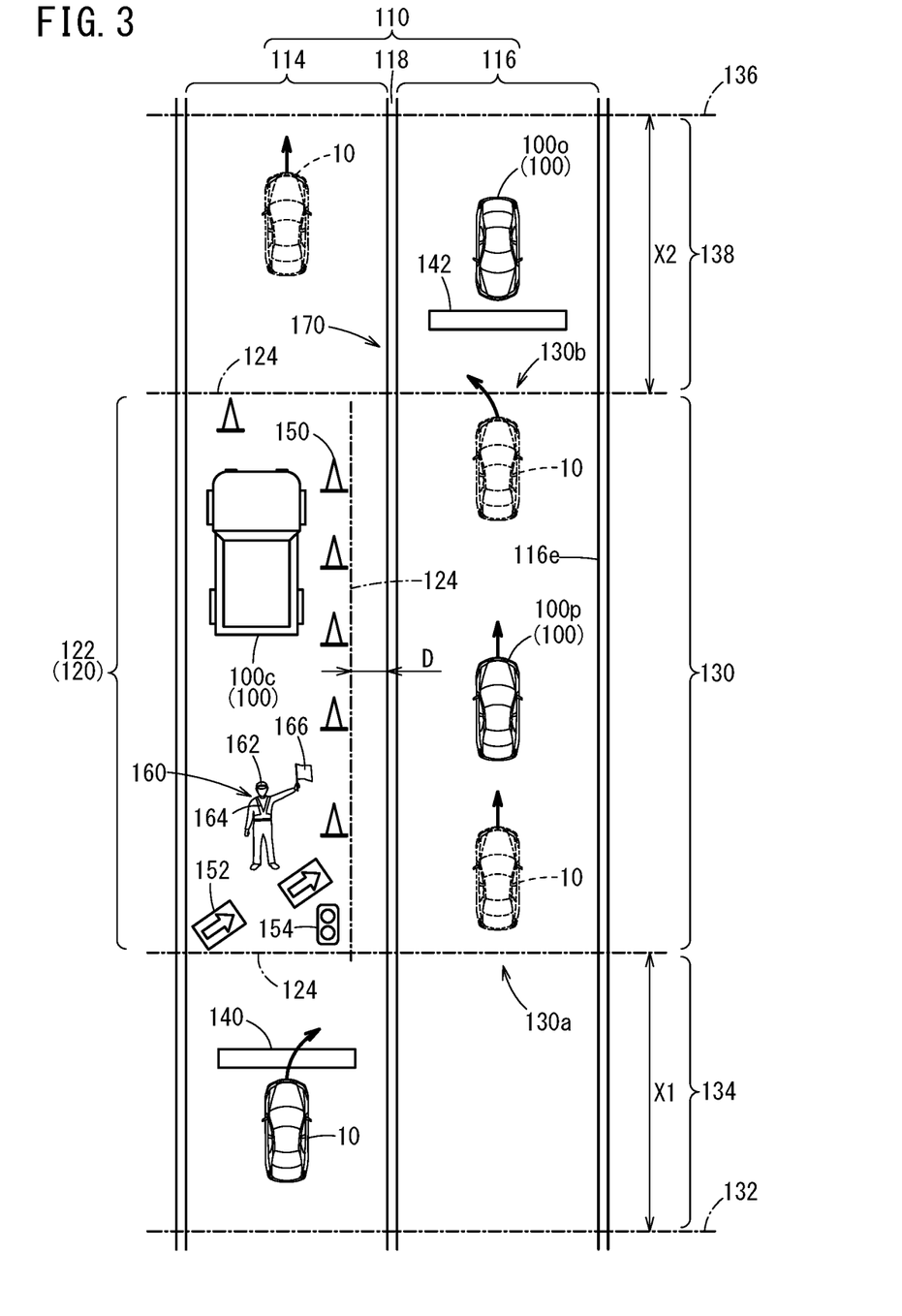
FIG. 3 schematically illustrates a construction section and a peripheral state thereof.

In the present embodiment, a circumstance illustrated in FIG. 3 is mainly described. As illustrated in FIG. 3, the road 110 includes the first travel path 114 and a second travel path 116 in which vehicles travel in opposite (counter) directions. The first travel path 114 and the second travel path 116 are sectioned by a center line 118. The host vehicle 10 travels in the first travel path 114, and an oncoming vehicle 100*o* as the other vehicle 100 travels in the second travel path 116. In a part of the road 110, the construction section 130 is present and includes a construction site 122. The construction site 122 blocks the first travel path 114. Thus, vehicles can travel in the construction section 130 by using the second travel path 116 (one-side alternate traffic).

Definitions in the present specification are described below. The construction site 122 is an area including an installation object peculiar to the construction (cones 150, a sign 152, the temporary traffic light 154, or the like), a construction vehicle 100*c*, a traffic control person 160, or the like. Borders 124 of the construction site 122 are estimated by connecting the installation object that is positioned at the outermost periphery of the construction site 122, the construction vehicle 100*c*, the traffic control person 160, and the like. A traveling direction in the first travel path 114 (upward direction in FIG. 3) is a forward direction, and a traveling direction in the second travel path 116 (downward direction in FIG. 3) is a backward direction. In the present specification, a section where the construction site 122 exists in the road 110 is referred to as the construction section 130. A part where vehicles enter a travel possible area of the construction section 130 in the forward direction is referred to as an entrance 130*a* of the construction section 130, and a part where vehicles exit from the travel possible area of the construction section 130 in the forward direction is referred to as an exit 130*b* of the construction section 130.

In the first travel path 114 on the backward direction side of the construction site 122, a first stop line 140 is set. In the second travel path 116 on the forward direction side of the construction site 122, a second stop line 142 is set. The road 110 from the construction site 122 to a first position 132 that is separated from the construction site 122 by a predetermined distance X1 toward the backward direction is referred to as an entrance area 134. The entrance area 134 includes the entrance 130*a* of the construction section 130 and the first stop line 140. Similarly, the road 110 from the construction site 122 to a second position 136 that is separated from the construction site 122 by a predetermined distance X2 toward the forward direction is referred to as an exit area 138. The exit area 138 includes the exit 130b of the construction section 130 and the second stop line 142.

3. Operation of Vehicle Control Device 12

[3.1. Main Process]

Figure 4:
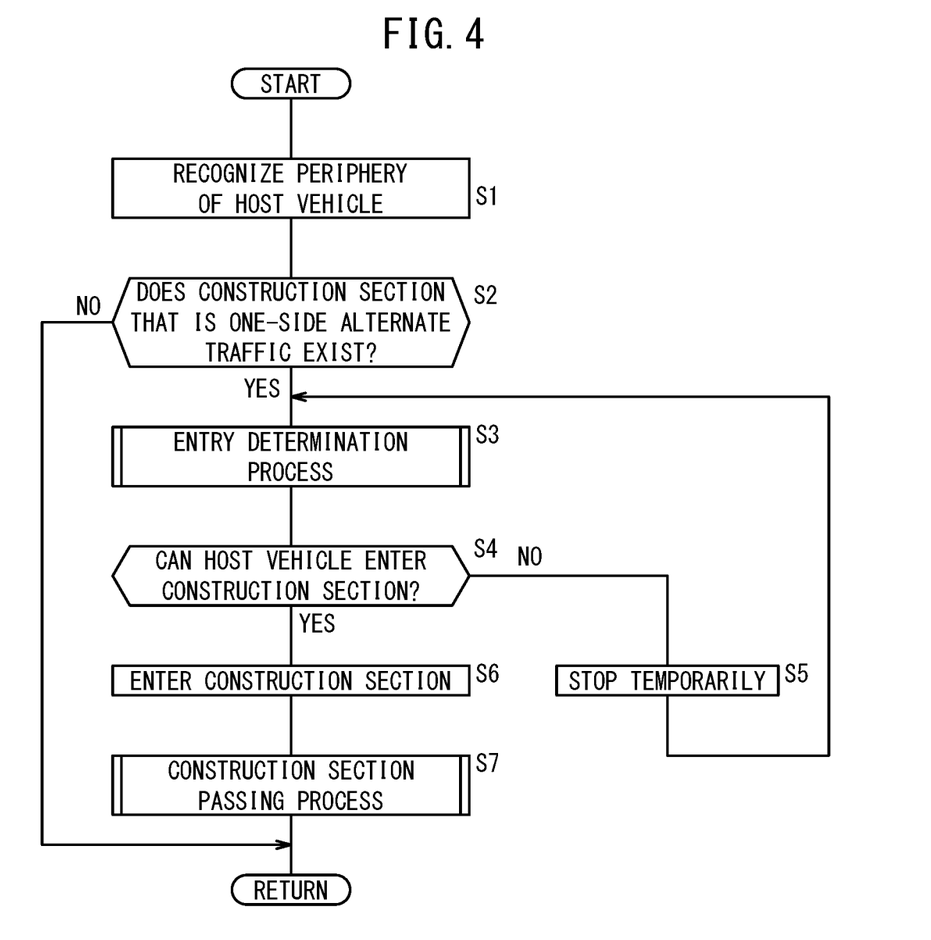
FIG. 4 is a flowchart of a main process to be performed by the vehicle control device according to the present embodiment.

An operation of the vehicle control device 12 is described with reference to FIG. 4. A main process shown in FIG. 4 is performed at predetermined time intervals while the vehicle control device 12 performs the automated driving. In the following process, if the external environment recognition unit 54 cannot recognize the presence or absence of the recognition object or cannot recognize whether the recognition object is the avoidance object 120, vehicle control is taken over from the action plan unit 58 to the vehicle occupant. At this time, the notification control unit 68 performs notification control to prompt the vehicle occupant to drive the host vehicle 10. Then, if the vehicle occupant does not perform a driving operation within a predetermined time, the vehicle control unit 66 pulls over the host vehicle 10.

In step S1, the external environment recognition unit 54 recognizes the peripheral state of the host vehicle 10 on the basis of the latest information that is output from the input system device group 14. Note that the external environment recognition unit 54 recognizes the peripheral state of the host vehicle 10 periodically in parallel with each process below.

In step S2, the external environment recognition unit 54 recognizes whether the construction section 130 exists. Then, if the construction section 130 exists, the external environment recognition unit 54 recognizes whether the construction section 130 has the one-side alternate traffic. For example, it is recognized whether the construction section 130 exists by identifying the installation object peculiar to the construction site 122 (the cones 150, the sign 152, the temporary traffic light 154, or the like), the construction vehicle 100c, the traffic control person 160, or the like on the basis of the image information acquired by the cameras 18. The external environment recognition unit 54 identifies as the traffic control person 160, a person who wears a helmet 162 or a working uniform 164 that emits light, or a person who has a handflag 166 or a traffic wand (not shown). In addition, if the recognition object such as the traffic control person 160 and the temporary traffic light 154 expresses entry possible/impossible information as to whether the host vehicle 10 can enter the construction section 130, the external environment recognition unit 54 recognizes that the construction section 130 has the one-side alternate traffic. Moreover, if the border 124 of the construction site 122 in the width direction is over the center line 118 to the second travel path 116 side or if a separation distance D between the border 124 and the center line 118 is less than or equal to a predetermined distance, the external environment recognition unit 54 can also recognize that the construction section 130 has the one-side alternate traffic. Furthermore, if the road-side communication device 112 (FIG. 1) that delivers construction information is installed in the construction section 130, the external environment recognition unit 54 can also recognize that the construction section 130 has the one-side alternate traffic on the basis of the delivered construction information.

If the external environment recognition unit 54 recognizes the construction section 130 that results in the one-side alternate traffic (step S2: YES), the process advances to step S3. On the other hand, if the external environment recognition unit 54 does not recognize the construction section 130 that includes the one-side alternate traffic (step S2: NO), a series of processes is terminated. At this time, the action plan unit 58 sets the target speed and the travel trajectory that causes the host vehicle 10 to travel in the first travel path 114, so that the host vehicle 10 travels in the first travel path 114.

When the process has advanced from step S2 to step S3, an entry determination process is performed. Here, it is determined whether the host vehicle 10 can enter the construction section 130. The entry determination process will be described in [3.2].

As a result of the entry determination process, if the host vehicle 10 can enter the construction section 130 (step S4: YES), the process advances to step S6. On the other hand, as the result of the entry determination process, if the host vehicle 10 cannot enter the construction section 130 (step S4: NO), the process advances to step S5.

When the process has advanced from step S4 to step S5, the avoidance action plan unit 62 determines an action that causes the host vehicle 10 to temporarily stop in the entrance area 134 of the construction section 130. If the host vehicle 10 has not reached the first stop line 140 yet, the avoidance action plan unit 62 sets the target speed and the travel trajectory that causes the host vehicle 10 to stop at the first stop line 140 or a position that is separated from the construction site 122 by a predetermined stop distance. The vehicle control unit 66 calculates the acceleration/deceleration instruction value and the steering instruction value that are necessary to cause the host vehicle 10 to travel at the target speed along the travel trajectory, and outputs the values to the output system device group 80. The driving force output device 82, the steering device 84, and the braking device 86 operate in accordance with the instructions output from the vehicle control unit 66. Note that if the host vehicle 10 has already stopped temporarily, the avoidance action plan unit 62 causes the host vehicle 10 to continue to stop. Then, the process returns to the entry determination process in step S3.

When the process has advanced from step S4 to step S6, the avoidance action plan unit 62 determines an action that causes the host vehicle 10 to enter the construction section 130. The avoidance action plan unit 62 sets the travel trajectory that causes the host vehicle 10 to enter the second travel path 116 while avoiding the construction site 122. For example, central positions in the width direction of the road 110 (between the border 124 of the construction site 122 and an outermost side end 116e of the second travel path 116) where the host vehicle 10 can travel are determined along an extending direction of the road 110. Then, connecting these central positions and the travel positions of the host vehicle 10 with a smooth curve forms the travel trajectory. In addition, the avoidance action plan unit 62 sets the target speed to be within a predetermined speed. The vehicle control unit 66 calculates the acceleration/deceleration instruction value and the steering instruction value that are necessary to cause the host vehicle 10 to travel at the target speed along the travel trajectory, and outputs the values to the output system device group 80. The driving force output device 82, the steering device 84, and the braking device 86 operate in accordance with the instructions output from the vehicle control unit 66. Then, the process advances to step S7.

In step S7, a construction section passing process is performed. Here, control to cause the host vehicle 10 to travel in the construction section 130 is performed, and control to cause the host vehicle 10 to return to the first travel path 114 in the exit area 138 is performed. The construction section passing process will be described in [3.3]. After step S7 ends, the host vehicle 10 returns to the first travel path 114 and continues to travel.

[3.2. Entry Determination Process]

Figure 5:
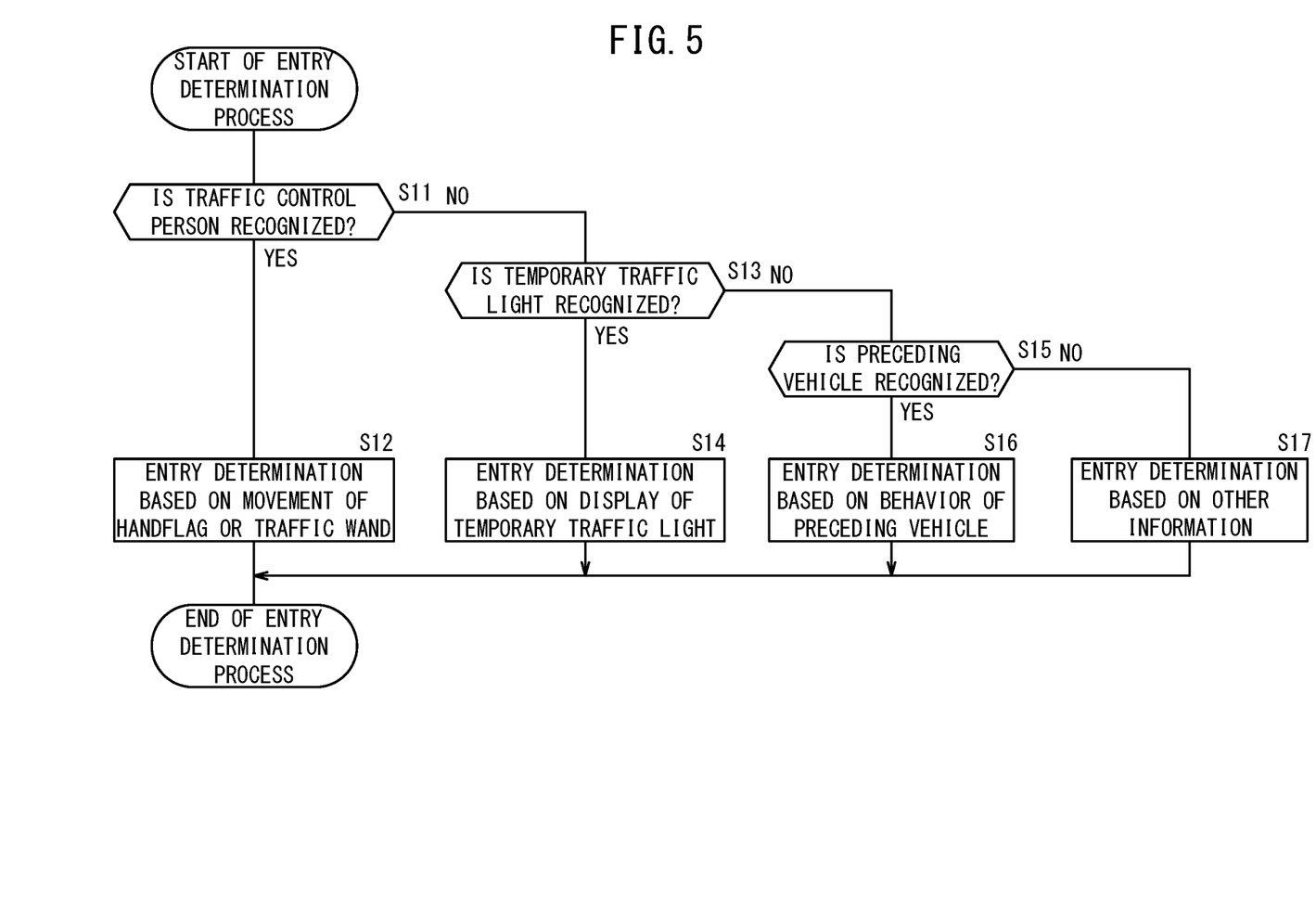
FIG. 5 is a flowchart of an entry determination process.

Description is given concerning the entry determination process that is performed in step S3 in the main process with reference to FIG. 5. In the following process, since the reliability of the entry possible/impossible information that is expressed by the traffic control person 160 is the highest, it is determined whether the host vehicle 10 can enter the construction section 130 by using preferentially the entry possible/impossible information expressed by the traffic control person 160. Moreover, since the reliability of the entry possible/impossible information that is expressed by the temporary traffic light 154 is the second highest, it is determined whether the host vehicle 10 can enter the construction section 130 by using preferentially the entry possible/impossible information expressed by the temporary traffic light 154 in a case where the traffic control person 160 cannot be recognized.

If the external environment recognition unit 54 recognizes the traffic control person 160 (step S11: YES), the process advances to step S12. On the other hand, if the external environment recognition unit 54 does not recognize the traffic control person 160 (step S11: NO), the process advances to step S13.

Note that if the traffic control person 160 wears neither the helmet 162 nor the working uniform 164 or if the traffic control person 160 has neither the handflag 166 nor the traffic wand, the external environment recognition unit 54 recognizes that the reliability of the traffic control person 160 is low. If the external environment recognition unit 54 recognizes the traffic control person 160 but the reliability is low in step S11, the process advances to step S13.

When the process has advanced from step S11 to step S12, the external environment recognition unit 54 recognizes the movement of the handflag 166 or the traffic wand of the traffic control person 160 on the basis of the image information, and determines whether the host vehicle 10 can enter the construction section 130 on the basis of the movement. If the movement of the handflag 166 or the traffic wand expresses that the host vehicle 10 can enter the construction section 130, it is determined that the host vehicle 10 can enter the construction section 130. On the other hand, if the movement expresses that the host vehicle 10 cannot enter the construction section 130, it is determined that the host vehicle 10 cannot enter the construction section 130. Then, the process advances to step S4 in the main process.

If the process advances from step S11 to step S13, and the external environment recognition unit 54 recognizes the temporary traffic light 154 (step S13: YES), the process advances to step S14. On the other hand, if the external environment recognition unit 54 does not recognize the temporary traffic light 154 (step S13: NO), the process advances to step S15.

For example, if the temporary traffic light 154 is exposed to the sunlight and it is difficult to recognize the display of the temporary traffic light 154, the external environment recognition unit 54 recognizes that the reliability of the temporary traffic light 154 is low. If the external environment recognition unit 54 recognizes the temporary traffic light 154 but the reliability is low in step S13, the process advances to step S15.

When the process has advanced from step S13 to step S14, the external environment recognition unit 54 recognizes the display of the temporary traffic light 154, for example, a display color or time display, on the basis of the image information, and determines whether the host vehicle 10 can enter the construction section 130 on the basis of the display content. If the temporary traffic light 154 expresses that the host vehicle 10 can enter the construction section 130, it is determined that the host vehicle 10 can enter the construction section 130. On the other hand, if the temporary traffic light 154 expresses that the host vehicle 10 cannot enter the construction section 130, it is determined that the host vehicle 10 cannot enter the construction section 130. Then, the process advances to step S4 in the main process.

If the process advances from step S13 to step S15, and the external environment recognition unit 54 recognizes a preceding vehicle 100p that travels ahead of the host vehicle 10 (step S15: YES), the process advances to step S16. On the other hand, if the external environment recognition unit 54 does not recognize the preceding vehicle 100p (step S15: NO), the process advances to step S17.

When the process has advanced from the step S15 to step S16, the external environment recognition unit 54 recognizes behavior of the other vehicle 100 on the basis of the image information or the external environment information acquired by the other-vehicle communication device 102, and determines whether the host vehicle 10 can enter the construction section 130 on the basis of the behavior. If the preceding vehicle 100p enters the construction section 130, it is determined that the host vehicle 10 can enter the construction section 130. On the other hand, if the preceding vehicle 100p stops before the construction section 130, it is determined that the host vehicle 10 cannot enter the construction section 130. Then, the process advances to step S4 in the main process.

When the process has advanced from step S15 to step S17, the external environment recognition unit 54 recognizes the behavior of the other vehicle 100 on the basis of the entry possible/impossible information that is expressed by another recognition object, and determines whether the host vehicle 10 can enter the construction section 130 on the basis of the behavior. Then, the process advances to step S4 in the main process.

[3.3. Construction Section Passing Process]

Figure 6:
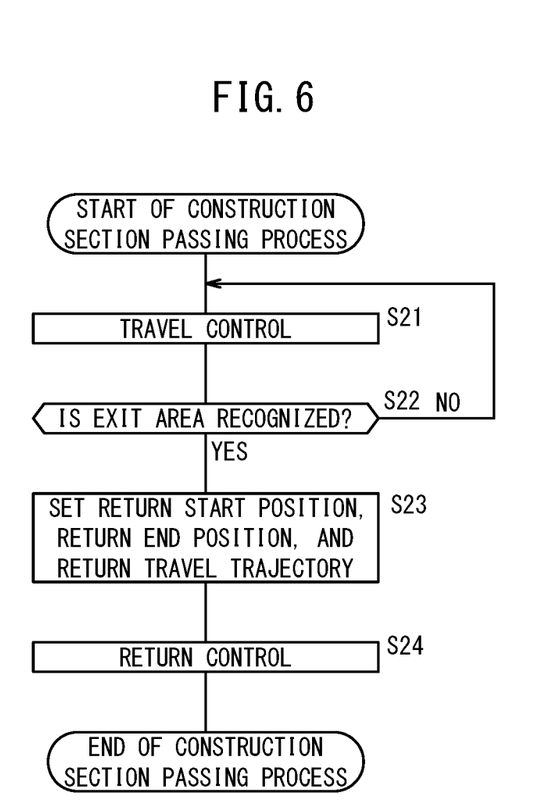
FIG. 6 is a flowchart of a construction section passing process.

Description is given concerning the construction section passing process that is performed in step S7 in the main process with reference to FIG. 6.

In step S21, the travel control that causes the host vehicle 10 to travel in the construction section 130 is performed. The external environment recognition unit 54 recognizes the border 124 of the construction section 130, the center line 118, a lane mark of the outermost side end 116e of the second travel path 116, a road structure, and the like, so that a travel path width where the host vehicle 10 can travel is recognized. The passage action plan unit 64 decides the travel position of the host vehicle 10, for example, the central position of the travel path, on the basis of the recognition result from the external environment recognition unit 54, and sets the travel trajectory and the target speed. The vehicle control unit 66 calculates the acceleration/deceleration instruction value and the steering instruction value that are necessary to cause the host vehicle 10 to travel at the target speed along the travel trajectory, and outputs the values to the output system device group 80. The driving force output device 82, the steering device 84, and the braking device 86 operate in accordance with the instructions output from the vehicle control unit 66.

In step S22, the external environment recognition unit 54 recognizes the presence or absence of the exit area 138 continuously or at constant time intervals while the host vehicle 10 travels in the construction section 130. For example, if the external environment recognition unit 54 stops recognizing the installation object peculiar to the construction site 122, such as the cone 150, in other words, it is recognized that the number of lanes increases to the first travel path 114 side, the external environment recognition unit 54 recognizes the exit area 138. Alternatively, the external environment recognition unit 54 recognizes the exit area 138 by recognizing that the travel path width where the host vehicle 10 can travel increases to the first travel path 114 side by a predetermined amount or more, or a predetermined rate or more. Further alternatively, the external environment recognition unit 54 can recognize the exit area 138 by recognizing that the preceding vehicle 100p moves to the first travel path 114 side, or recognizing a road sign expressing that the construction section 130 ends.

If the external environment recognition unit 54 recognizes the exit area 138 (step S22: YES), the process advances to step S23. On the other hand, if the external environment recognition unit 54 does not recognize the exit area 138 (step S22: NO), the process returns to step S21 and the travel control in the construction section 130 is continued.

Figure 7:
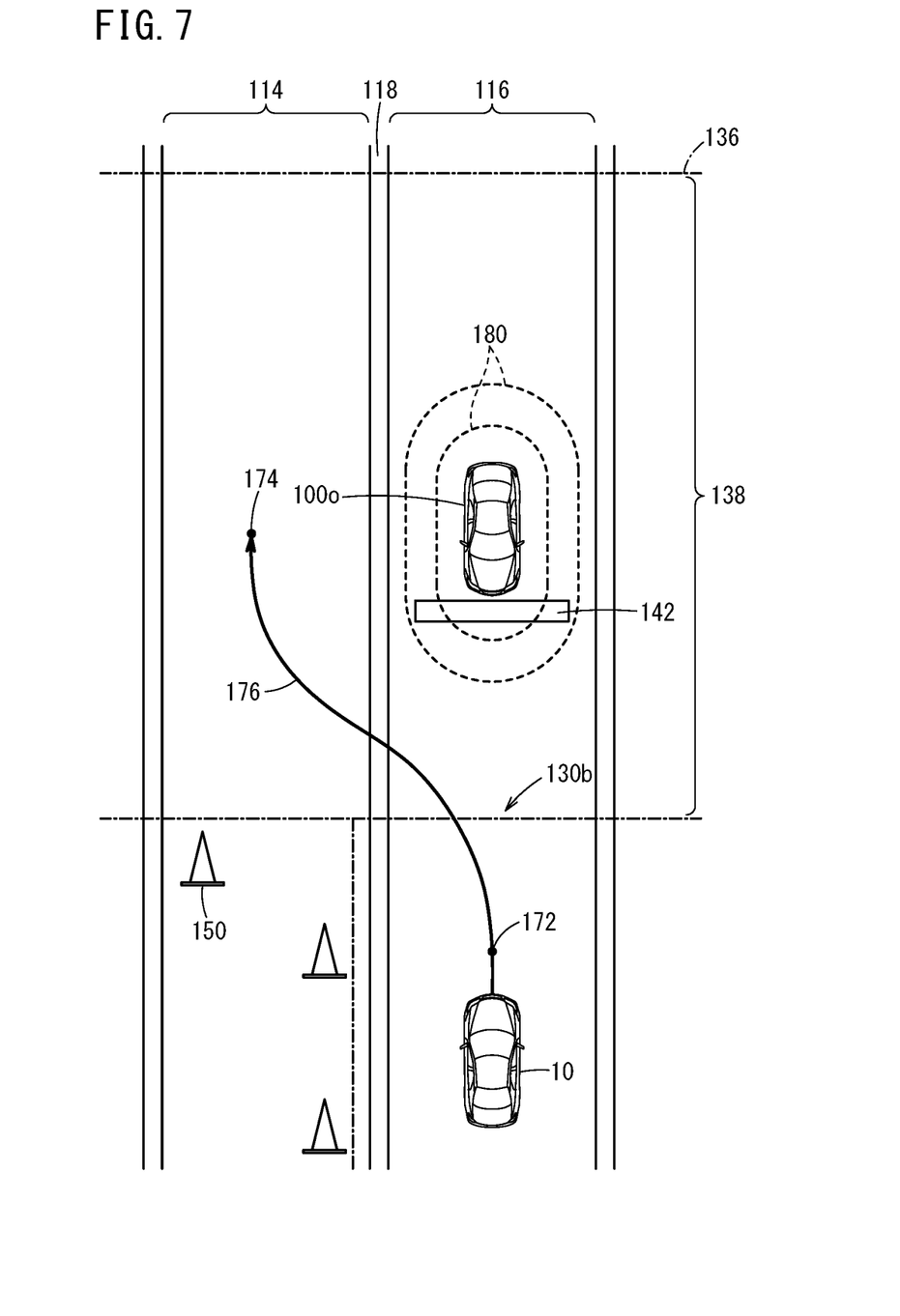
FIG. 7 illustrates contour lines of risk potential in a case where an oncoming vehicle stops.
Figure 8:
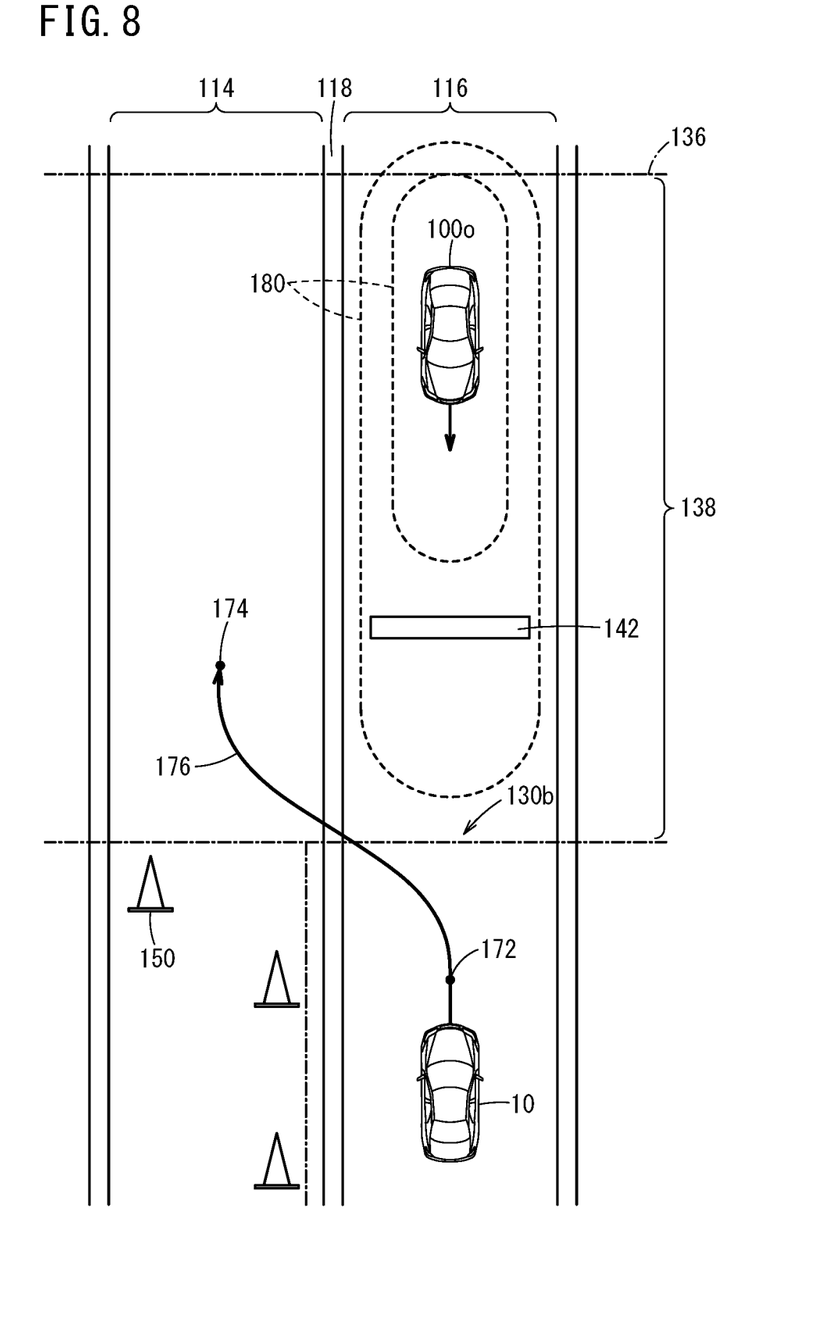
FIG. 8 illustrates the contour lines of the risk potential in a case where the oncoming vehicle is traveling.

When the process has advanced from step S22 to step S23, the passage action plan unit 64 sets a return start position 172, a return end position 174, and a return travel trajectory 176 to cause the host vehicle 10 to return to the first travel path 114 as illustrated in FIG. 7 and FIG. 8. At this time, the external environment recognition unit 54 recognizes oncoming vehicle information including information of the presence or absence of the oncoming vehicle 100o in the exit area 138, the position of the oncoming vehicle 100o in the exit area 138, and behavior (its speed, acceleration/deceleration speed, for example) of the oncoming vehicle 100o in the exit area 138. The passage action plan unit 64 estimates risk potential that expresses the possibility of being in contact with the oncoming vehicle 100o on the basis of the oncoming vehicle information. The risk potential can be estimated on the basis of a result of a simulation that is performed in advance.

FIG. 7 illustrates contour lines 180 of the risk potential in a case where the oncoming vehicle 100o stops. In the case where the oncoming vehicle 100o stops around the second stop line 142, the passage action plan unit 64 determines that the possibility of the contact is high around the stop position of the oncoming vehicle 100o, and the possibility of the contact becomes lower as the distance from the oncoming vehicle 100o becomes larger. FIG. 8 illustrates the contour lines 180 of the risk potential in a case where the oncoming vehicle 100o is traveling. In the case where the oncoming vehicle 100o is traveling, the passage action plan unit 64 determines that the possibility of the contact is high in a wider range in the traveling direction of the oncoming vehicle 100o compared with the case where the oncoming vehicle 100o stops. Thus, the passage action plan unit 64 extends the contour lines 180 of the risk potential when the oncoming vehicle 100o is traveling, to the host vehicle 10 side, compared with the contour lines 180 of the risk potential when the oncoming vehicle 100o stops.

The passage action plan unit 64 sets the travel position that minimizes the risk that the host vehicle 10 is in contact with the construction site 122 and the oncoming vehicle 100o on the basis of the risk potential and the shape of a travel possible area 170 (its width, length, or the like) that is positioned between the construction site 122 and the oncoming vehicle 100o. Then, the start position of the travel position is referred to as the return start position 172 and the end position of the travel position is referred to as the return end position 174. Then, connecting these travel positions with a smooth curve forms the return travel trajectory 176.

In step S24, return control that causes the host vehicle 10 to return to the first travel path 114 is performed. The vehicle control unit 66 calculates the acceleration/deceleration instruction value and the steering instruction value that are necessary to cause the host vehicle 10 to travel along the return travel trajectory 176 from the return start position 172 to the return end position 174 at the target speed, and outputs the values to the output system device group 80. The driving force output device 82, the steering device 84, and the braking device 86 operate in accordance with the instructions output from the vehicle control unit 66. Moreover, the notification control unit 68 performs the notification control to notify the vehicle occupant of the host vehicle 10 that the host vehicle 10 exits the construction section 130. Then, the process returns to the main process, and a series of the processes is terminated.

4. Modifications

The passage action plan unit 64 can set the return start position 172, the return end position 174, and the return travel trajectory 176 on the basis of road surface information that expresses a state of a road surface of the exit area 138 and/or weather information, in addition to the oncoming vehicle information. For example, the slipperiness of the road surface is different between a case where an iron plate is laid on the road surface and a case where the road surface is paved with asphalt. The slipperiness of the road surface is different between a case where it is rainy and a case where it is sunny. If the external environment recognition unit 54 recognizes the road surface information and the weather information expressing that the road surface is slippery, the passage action plan unit 64 reduces the curvature of the return travel trajectory 176 or the target speed compared with a case where the external environment recognition unit 54 recognizes the road surface information and the weather information expressing that the road surface is not slippery.

The external environment recognition unit 54 recognizes the road surface information from the image information or the reflectance detected by the radars 24 or the LIDARs 26. Moreover, if the external environment information acquired by the second communication device 32 includes information regarding the weather, the external environment recognition unit 54 recognizes the weather information. Furthermore, the weather information in a wide area may be acquired, or the weather at this site may be directly detected by using a raindrop sensor, a solar radiation sensor, or the like.

Note that if the preceding vehicle 100p exists within a predetermined distance from the host vehicle 10, the host vehicle 10 can pass the construction section 130 by performing trajectory trace control to trace a travel trajectory of the preceding vehicle 100p.

5. Summary of the Present Embodiment

The vehicle control device 12 includes: the external environment recognition unit 54 configured to recognize the peripheral state of the host vehicle 10; the action plan unit 58 configured to determine the action to be performed by the host vehicle 10 on the basis of the recognition result from the external environment recognition unit 54; and the vehicle control unit 66 configured to perform the travel control of the host vehicle 10 on the basis of the determination result from the action plan unit 58. The external environment recognition unit 54 is configured to recognize the construction section 130 ahead of the host vehicle 10 and recognize that one or more recognition objects express the entry possible/impossible information as to whether the host vehicle 10 can enter the construction section 130. If the external environment recognition unit 54 recognizes the traffic control person 160 who directs traffic in the construction section 130 as the recognition object and recognizes the entry possible/impossible information that is expressed by the traffic control person 160, the action plan unit 58 (entry determination unit 60) is configured to decide whether to cause the host vehicle 10 to enter the construction section 130 or to stop before the construction section 130 by using preferentially the entry possible/impossible information that is expressed by the traffic control person 160.

In the above configuration, if the pieces of entry possible/impossible information are recognized and the pieces of entry possible/impossible information include the entry possible/impossible information expressed by the traffic control person 160, the entry possible/impossible information expressed by the traffic control person 160 is used preferentially. Thus, it can be appropriately determined whether the host vehicle 10 can enter the construction section 130.

The external environment recognition unit 54 is configured to recognize the entry possible/impossible information on the basis of the movement of the handflag 166 or the traffic wand of the traffic control person 160.

In the above configuration, since the handflag 166 or the traffic wand used in the traffic control is recognized, it is easy to recognize the entry possible/impossible information.

The external environment recognition unit 54 is configured to recognize as the traffic control person 160, a person who wears the helmet 162 and/or the working uniform 164 that emits light.

In the above configuration, since the clothing peculiar to the traffic control person, such as the helmet 162 and the working uniform 164 is recognized, it is easy to identify the traffic control person 160.

If the external environment recognition unit 54 does not recognize the traffic control person 160 and recognizes the temporary traffic light 154 that is installed in the construction section 130 as the recognition object and the entry possible/impossible information that is expressed by the temporary traffic light 154, the action plan unit 58 (entry determination unit 60) is configured to decide whether to cause the host vehicle 10 to enter the construction section 130 or to stop before the construction section 130 by using preferentially the entry possible/impossible information that is expressed by the temporary traffic light 154.

In the above configuration, if the entry possible/impossible information expressed by the traffic control person 160 is not recognized and the entry possible/impossible information expressed by the temporary traffic light 154 is recognized, the entry possible/impossible information expressed by the temporary traffic light 154 is used preferentially. Thus, it can be appropriately determined whether the host vehicle 10 can enter the construction section 130.

If the external environment recognition unit 54 recognizes neither the traffic control person 160 nor the temporary traffic light 154 and recognizes the entry possible/impossible information that is expressed by the recognition object other than the traffic control person 160 and the temporary traffic light 154, the action plan unit 58 (entry determination unit 60) is configured to decide whether to cause the host vehicle 10 to enter the construction section 130 or to stop before the construction section 130 by using the entry possible/impossible information that is expressed by the recognition object other than the traffic control person 160 and the temporary traffic light 154.

In the above configuration, if the entry possible/impossible information expressed by the traffic control person 160 or the temporary traffic light 154 is not recognized and other entry possible/impossible information is recognized, the latter entry possible/impossible information is used. Thus, it can be appropriately determined whether the host vehicle 10 can enter the construction section 130.

If the external environment recognition unit 54 recognizes the preceding vehicle 100*p* that travels ahead of the host vehicle 10 as the recognition object, the action plan unit 58 (entry determination unit 60) is configured to decide whether to cause the host vehicle 10 to enter the construction section 130 or to stop before the construction section 130 in accordance with the behavior of the preceding vehicle 100*p*.

In the above configuration, if the entry possible/impossible information expressed by the traffic control person 160 or the temporary traffic light 154 is not recognized and the preceding vehicle 100*p* is recognized, it can be appropriately determined whether the host vehicle 10 can enter the construction section 130 on the basis of the behavior of the preceding vehicle 100*p*.

The vehicle control device according to the present invention is not limited to the embodiment above, and can employ various configurations without departing from the gist of the present invention.

What is claimed is:
1. A vehicle control device comprising:
an external environment recognition unit configured to recognize a peripheral state of a host vehicle;
an action plan unit configured to determine an action to be performed by the host vehicle on a basis of a recognition result from the external environment recognition unit; and
a vehicle control unit configured to perform travel control of the host vehicle on a basis of a determination result from the action plan unit,
wherein:
the external environment recognition unit is configured to recognize a construction section ahead of the host vehicle and recognize that one or more recognition objects express entry possible/impossible information as to whether the host vehicle can enter the construction section; and
if the external environment recognition unit recognizes a traffic control person who directs traffic in the construction section as the recognition object and recognizes the entry possible/impossible information that is expressed by the traffic control person, the action plan unit is configured to decide whether to cause the host vehicle to enter the construction section or to stop before the construction section by using preferentially the entry possible/impossible information that is expressed by the traffic control person.

2. The vehicle control device according to claim 1, wherein the external environment recognition unit is configured to recognize the entry possible/impossible information on a basis of a movement of a handflag or a traffic wand of the traffic control person.

3. The vehicle control device according to claim 1, wherein the external environment recognition unit is configured to recognize as the traffic control person, a person who wears a helmet and/or a working uniform that emits light.

4. The vehicle control device according to claim 1, wherein if the external environment recognition unit does not recognize the traffic control person and recognizes a temporary traffic light that is installed in the construction section as the recognition object and the entry possible/impossible information that is expressed by the temporary traffic light, the action plan unit is configured to decide whether to cause the host vehicle to enter the construction section or to stop before the construction section by using preferentially the entry possible/impossible information that is expressed by the temporary traffic light.

5. The vehicle control device according to claim 4, wherein if the external environment recognition unit recognizes neither the traffic control person nor the temporary traffic light and recognizes the entry possible/impossible information that is expressed by the recognition object other than the traffic control person and the temporary traffic light, the action plan unit is configured to decide whether to cause the host vehicle to enter the construction section or to stop before the construction section by using the entry possible/impossible information that is expressed by the recognition object other than the traffic control person and the temporary traffic light.

6. The vehicle control device according to claim 5, wherein if the external environment recognition unit recognizes a preceding vehicle that travels ahead of the host vehicle as the recognition object, the action plan unit is configured to decide whether to cause the host vehicle to enter the construction section or to stop before the construction section in accordance with behavior of the preceding vehicle.

\* \* \* \* \*